(12) United States Patent
Soma et al.

(10) Patent No.: US 7,820,746 B2  
(45) Date of Patent: Oct. 26, 2010

(54) THERMOPLASTIC POLYMER COMPOSITION

(75) Inventors: Ryoji Soma, Toyonaka (JP); Naoki Inui, Yamatokoriyama (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 0 days.

(21) Appl. No.: 12/415,628

(22) Filed: Mar. 31, 2009

(65) Prior Publication Data

US 2009/0247675 A1    Oct. 1, 2009

(30) Foreign Application Priority Data

Mar. 31, 2008    (JP) .............................. 2008-090680

(51) Int. Cl.
*C08K 5/527* (2006.01)
*C08K 5/053* (2006.01)

(52) U.S. Cl. ...................................... 524/117; 524/387

(58) Field of Classification Search ................. 524/117, 524/387
See application file for complete search history.

(56) References Cited

FOREIGN PATENT DOCUMENTS

| EP | 0 823 435 A2 | 2/1998 |
|---|---|---|
| JP | 9-67474 A | 3/1997 |
| JP | 10-273494 A | 10/1998 |

*Primary Examiner*—Peter Szekely
(74) *Attorney, Agent, or Firm*—Birch, Stewart, Kolasch & Birch, LLP

(57) ABSTRACT

A thermoplastic polymer composition having excellent resistance to heat discoloration has been desired. There is provided a thermoplastic polymer composition characterized by comprising a thermoplastic polymer, phosphites represented by the formula (I), and at least one kind of erythritols selected from the group consisting of pentaerythritol, dipentaerythritol and tripentaerythritol:

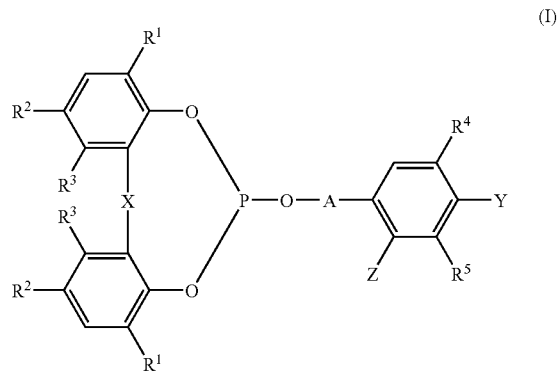

wherein $R^1$, $R^2$, $R^4$ and $R^5$ each independently denotes a hydrogen atom, an alkyl group or the like, and $R^3$ denotes a hydrogen atom or an alkyl group; X denotes a single bond, a sulfur atom or a —$CHR^6$ group ($R^6$ denotes a hydrogen atom, an alkyl group or a cycloalkyl group); A denotes an alkylene group or a *—$COR^7$ group ($R^7$ denotes a single bond or an alkylene group, and * denotes a bonding hand on the side of oxygen), and one of Y and Z denotes a hydroxyl group or the like, and the other one of Y and Z denotes a hydrogen atom or an alkyl group).

5 Claims, No Drawings

THERMOPLASTIC POLYMER COMPOSITION

This application is filed claiming the Paris Convention priority of Japanese Patent Application No. 2008-090680, the entire content of which is herein incorporated by reference.

FIELD OF THE INVENTION

The present invention relates to a thermoplastic polymer composition, and the like.

BACKGROUND OF THE INVENTION

It is known in Japanese Unexamined Patent Publication No. 10-273494 (Claims, Examples) that phosphites represented by the formula (I) (hereinafter may be referred to as phosphites (I)) are useful as antioxidants for a thermoplastic polymer such as polyolefin.

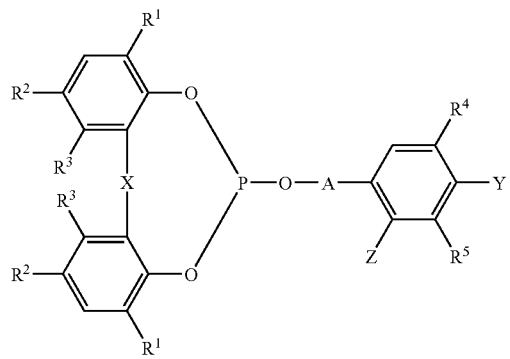

(I)

In the formula (I), $R^1$, $R^2$, $R^4$ and $R^5$ each independently denotes a hydrogen atom, an alkyl group having 1 to 8 carbon atoms, a cycloalkyl group having 5 to 8 carbon atoms, an alkylcycloalkyl group having 6 to 12 carbon atoms, an aralkyl group having 7 to 12 carbon atoms or a phenyl group, and $R^3$ denotes a hydrogen atom or an alkyl group having 1 to 8 carbon atoms. X denotes a single bond, a sulfur atom or a —$CHR^6$ group ($R^6$ denotes a hydrogen atom, an alkyl group having 1 to 8 carbon atoms or a cycloalkyl group having 5 to 8 carbon atoms). A denotes an alkylene group having 1 to 8 carbon atoms or a *—$COR^7$ group ($R^7$ denotes a single bond or an alkylene group having 1 to 8 carbon atoms, and * denotes a bonding hand on the side of oxygen). One of Y and Z denotes a hydroxyl group, an alkoxy group having 1 to 8 carbon atoms or an aralkyloxy group having 7 to 12 carbon atoms, and the other one of Y and Z denotes a hydrogen atom or an alkyl group having 1 to 8 carbon atoms.

SUMMARY OF THE INVENTION

A performance such that an obtained molded article is less colored even though repeatedly molded at high temperature has been recently requested for a thermoplastic polymer composition. Thus, a thermoplastic polymer composition having excellent resistance to heat discoloration has been desired.

Under such circumstances, the inventors of the present invention have reached the present invention as a result of earnest studies.

That is to say, the present invention provides the following inventions described in [1] to [6].

[1] A thermoplastic polymer composition comprising a thermoplastic polymer, phosphites represented by the formula (I), and at least one kind of erythritols selected from the group consisting of pentaerythritol, dipentaerythritol and tripentaerythritol:

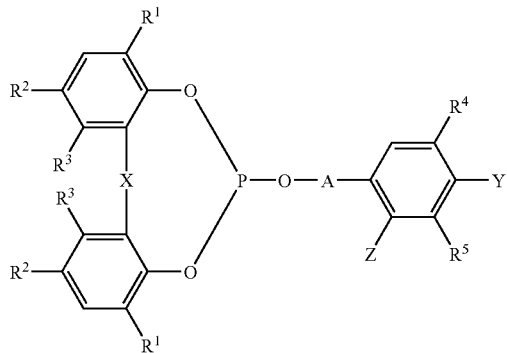

(I)

wherein $R^1$, $R^2$, $R^4$ and $R^5$ each independently denotes a hydrogen atom, an alkyl group having 1 to 8 carbon atoms, a cycloalkyl group having 5 to 8 carbon atoms, an alkylcycloalkyl group having 6 to 12 carbon atoms, an aralkyl group having 7 to 12 carbon atoms or a phenyl group, and $R^3$ denotes a hydrogen atom or an alkyl group having 1 to 8 carbon atoms; X denotes a single bond, a sulfur atom or a —$CHR^6$ group ($R^6$ denotes a hydrogen atom, an alkyl group having 1 to 8 carbon atoms or a cycloalkyl group having 5 to 8 carbon atoms); A denotes an alkylene group having 1 to 8 carbon atoms or a *—$COR^7$ group ($R^7$ denotes a single bond or an alkylene group having 1 to 8 carbon atoms, and * denotes a bonding hand on the side of oxygen); and one of Y and Z denotes a hydroxyl group, an alkoxy group having 1 to 8 carbon atoms or an aralkyloxy group having 7 to 12 carbon atoms, and the other one of Y and Z denotes a hydrogen atom or an alkyl group having 1 to 8 carbon atoms).

[2] The thermoplastic polymer composition according to [1], comprising 0.005 to 5 parts by weight of phosphites represented by the formula (I), and 0.01 to 0.5 part by weight of at least one kind of erythritols selected from the group consisting of pentaerythritol, dipentaerythritol and tripentaerythritol with respect to 100 parts by weight of the thermoplastic polymer.

[3] The thermoplastic polymer composition according to [1] or [2], further comprising 0.005 to 5 parts by weight of at least one kind of organophosphorus antioxidants selected from the group consisting of tris(2,4-di-t-butylphenyl)phosphite, bis(2,4-di-t-butylphenyl)pentaerythritol diphosphite, bis(2,6-di-t-butyl-4-methylphenyl)pentaerythritol diphosphite, bis(2,4-di-cumylphenyl)pentaerythritol diphosphite, and tetrakis(2,4-di-tert-butylphenyl)-4,4'-biphenylene diphosphonite with respect to 100 parts by weight of the thermoplastic polymer.

[4] The thermoplastic polymer composition according to any one of [1] to [3], wherein the thermoplastic polymer is polyolefin.

[5] The thermoplastic polymer composition according to any one of [1] to [4], wherein the thermoplastic polymer is an ethylene resin and/or a propylene resin.

[6] A use of at least one kind of erythritols selected from the group consisting of pentaerythritol, dipentaerythritol and tripentaerythritol, and phosphites represented by the formula (I) for improving resistance to heat discoloration of a thermoplastic polymer:

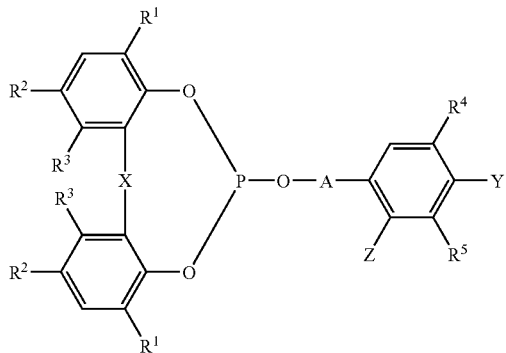

wherein $R^1$, $R^2$, $R^4$ and $R^5$ each independently denotes a hydrogen atom, an alkyl group having 1 to 8 carbon atoms, a cycloalkyl group having 5 to 8 carbon atoms, an alkylcycloalkyl group having 6 to 12 carbon atoms, an aralkyl group having 7 to 12 carbon atoms or a phenyl group, and $R^3$ denotes a hydrogen atom or an alkyl group having 1 to 8 carbon atoms; X denotes a single bond, a sulfur atom or a —$CHR^6$ group ($R^6$ denotes a hydrogen atom, an alkyl group having 1 to 8 carbon atoms or a cycloalkyl group having 5 to 8 carbon atoms); A denotes an alkylene group having 1 to 8 carbon atoms or a *—$COR^7$ group ($R^7$ denotes a single bond or an alkylene group having 1 to 8 carbon atoms, and * denotes a bonding hand on the side of oxygen); and one of Y and Z denotes a hydroxyl group, an alkoxy group having 1 to 8 carbon atoms or an aralkyloxy group having 7 to 12 carbon atoms, and the other one of Y and Z denotes a hydrogen atom or an alkyl group having 1 to 8 carbon atoms).

A thermoplastic polymer composition of the present invention is excellent in resistance to heat discoloration.

DETAILED DESCRIPTION OF THE PREFERRED EMBODIMENTS

The present invention is hereinafter described in detail.

The present invention is a thermoplastic polymer composition containing a thermoplastic polymer, phosphites represented by the above-mentioned formula (I) (hereinafter may be referred to as phosphites (I)), and at least one kind of erythritols selected from the group consisting of pentaerythritol, dipentaerythritol and tripentaerythritol.

(Thermoplastic Polymer)

Examples of a thermoplastic polymer used for the present invention include a propylene resin, an ethylene resin such as high-density polyethylene (HD-PE), low-density polyethylene (LD-PE), linear low-density polyethylene (LLDPE), an ethylene/ethyl acrylate copolymer resin, an ethylene/vinyl acetate copolymer resin, an ethylene/vinyl alcohol copolymer resin and an ethylene/methyl methacrylate copolymer, a methylpentene polymer, a styrene resin such as poly(para-methyl styrene), poly(α-methyl styrene), an acrylonitrile/styrene copolymer resin, an acrylonitrile/butadiene/styrene copolymer resin, a special acrylic rubber/acrylonitrile/styrene copolymer resin, an acrylonitrile/chlorinated polyethylene/styrene copolymer resin and a styrene/butadiene copolymer, halogenated polyolefin such as chlorinated polyethylene, polychloroprene, a chlorinated rubber, polyvinyl chloride and polyvinylidene chloride, an acrylic resin such as an acrylic resin and a methacrylic resin, fluororesin, polyacetal, a grafted polyphenylene ether resin, a polyphenylene sulfide resin, polyamide, a polyester resin such as polyethylene terephthalate and polybutylene terphthalate, polycarbonate, polysulfone, polyether ether ketone, polyether sulfone, an aromatic polyester resin, a diallyl phthalate prepolymer, a silicone resin, an elastomer such as 1,2-polybutadiene, polyisoprene and a butadiene/acrylonitrile copolymer. More preferable examples thereof include polyolefin. In particular, an ethylene resin and a propylene resin are preferable, and above all, a propylene resin is preferable.

Herein, an ethylene resin signifies polyolefin containing a structural unit derived from ethylene, and examples thereof include resins exemplified above.

A propylene resin signifies polyolefin containing a structural unit derived from propylene. Specific examples thereof include a crystalline propylene homopolymer, a propylene-ethylene random copolymer, a propylene-α-olefin random copolymer, a propylene-ethylene-α-olefin copolymer, and a polypropylene block copolymer composed of a propylene homopolymer component or a copolymer component mainly made of propylene, and a copolymer component of propylene and ethylene and/or α-olefin.

In the case of using propylene resin as a thermoplastic polymer in the present invention, a propylene resin may be used by one kind or by blending two kinds or more.

α-olefin used for a propylene resin is ordinarily α-olefin having 4 to 12 carbon atoms; and examples thereof include 1-butene, 1-pentene, 1-hexene, 4-methyl-1-pentene, 1-octene and 1-decene, and 1-butene, 1-hexene and 1-octene are more preferable.

Examples of a propylene-α-olefin random copolymer include a propylene-1-butene random copolymer, a propylene-1-hexene random copolymer and a propylene-1-octene random copolymer.

Examples of a propylene-ethylene-α-olefin copolymer include a propylene-ethylene-1-butene copolymer, a propylene-ethylene-1-hexene copolymer and a propylene-ethylene-1-octene copolymer.

Examples of a copolymer component mainly made of propylene in polypropylene block copolymer composed of a propylene homopolymer component or a copolymer component mainly made of propylene, and a copolymer component of propylene and ethylene and/or α-olefin include a propylene-ethylene copolymer component, a propylene-1-butene copolymer component and a propylene-1-hexene copolymer component, and examples of a copolymer component of propylene and ethylene and/or α-olefin therein include a propylene-ethylene copolymer component, a propylene-ethylene-1-butene copolymer component, a propylene-ethylene-1-hexene copolymer component, a propylene-ethylene-1-octene copolymer component, a propylene-1-butene copolymer component, a propylene-1-hexene copolymer component and a propylene-1-octene copolymer component. A content of ethylene and/or α-olefin having 4 to 12 carbon atoms in a copolymer component of propylene and ethylene and/or α-olefin is ordinarily 0.01 to 20% by weight.

Examples of a polypropylene block copolymer composed of propylene homopolymer component or copolymer component mainly made of propylene, and a copolymer component of propylene and ethylene and/or α-olefin include a propylene-ethylene block copolymer, a (propylene)-(propylene-ethylene) block copolymer, a (propylene)-(propyleneethylene-1-butene) block copolymer, a (propylene)-(propylene-ethylene-1-hexene) block copolymer, a (propylene)-(propylene-1-butene) block copolymer, a (propylene)-(propylene-1-hexene) block copolymer, a (propylene-ethylene)-(propylene-ethylene-1-butene) block copolymer, a (propylene-ethylene)-(propylene-ethylene-1-hexene) block copolymer, a (propylene-ethylene)-(propylene-1-butene) block copolymer, a (propylene-ethylene)-(propylene-1-hexene) block copolymer, a (propylene-1-butene)-(propylene-ethylene) block copolymer, a (propylene-1-butene)-(propylene-ethylene-1-butene) block copolymer, a (propylene-1-butene)-(propylene-ethylene-1-hexene) block copolymer, a (propylene-1-butene)-(propylene-1-butene) block copolymer and a (propylene-1-butene)-(propylene-1-hexene) block copolymer.

In the case of using propylene resin as a thermoplastic polymer, a crystalline propylene homopolymer and a polypropylene block copolymer composed of a propylene homopolymer component or a copolymer component mainly made of propylene, and a copolymer component of propylene and ethylene and/or α-olefin having 4 to 12 carbon atoms are preferable. A polypropylene block copolymer composed of a propylene homopolymer component or a copolymer component mainly made of propylene, and a copolymer component of propylene and ethylene and/or α-olefin having 4 to 12 carbon atoms is more preferable.

The crystallinity of a propylene resin is preferably high from the viewpoints of rigidity and scratch resistance. A propylene resin with high crystallinity is preferably 0.95 or more in the fraction (referred to as pentad fraction and expressed by [mmmm]) of a propylene monomer unit existing at the center of a chain such that five propylene monomer units are successively meso-bonded as a pentad unit in a propylene resin molecule measured in accordance with the method disclosed by A. Zambelli et al. (Macromolecules 6,925, 1973), used as an index of crystallinity.

For production of the propylene resin, preferable is a propylene resin which is produced by using, as a polymerization catalyst, for example, Ziegler catalyst, Ziegler-Natta catalyst, a catalyst system composed of a transition metallic compound in the IV group of the periodic table, having a cyclopentadienyl ring, and alkylaluminoxane, or a catalyst system composed of a transition metallic compound in the IV group of the periodic table, having a cyclopentadienyl ring, a compound for forming an ionic complex by reacting therewith and an organic aluminum compound.

Examples of a polymerization method for a propylene resin include a slurry polymerization method with a hydrocarbon solvent, a solvent polymerization method, a liquid phase polymerization method with no solvent, a vapor phase polymerization method or a liquid phase-vapor phase polymerization method for continuously performing them. These polymerization methods may be a batch-wise system or a continuous system, and may be a method for producing a propylene resin in one stage or a method for producing propylene resin in multiple stages of two stages or more. In particular, examples of a method for producing a polypropylene block copolymer composed of a propylene homopolymer component or copolymer component mainly made of propylene, and a copolymer component of propylene and ethylene and/or α-olefin having 4 to 12 carbon atoms include a method for producing in multiple stages of at least two stages or more composed of a stage for producing a propylene homopolymer component or copolymer component mainly made of propylene, and a stage for producing a copolymer component of propylene and ethylene and/or α-olefin having 4 to 12 carbon atoms.

The melt index (MI) of a thermoplastic polymer used for the present invention is preferably within a range of 0.01 to 100 g/10 minutes from the viewpoint of molding processability in the case of a propylene resin.

(Phosphites (I))

Phosphites represented by the formula (I) are used in the present invention:

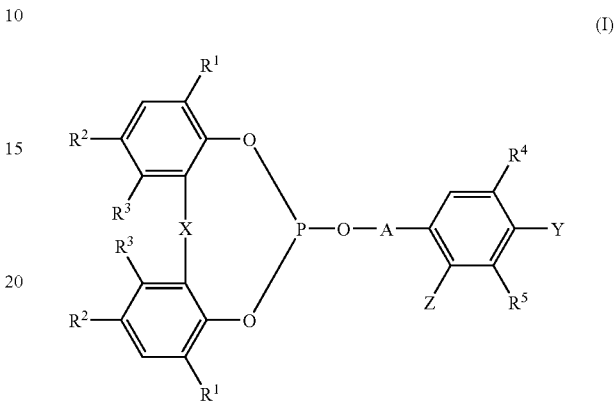

In phosphites represented by the formula (I), $R^1$, $R^2$, $R^4$ and $R^5$ each independently denotes a hydrogen atom, an alkyl group having 1 to 8 carbon atoms, a cycloalkyl group having 5 to 8 carbon atoms, an alkylcycloalkyl group having 6 to 12 carbon atoms, an aralkyl group having 7 to 12 carbon atoms or a phenyl group.

Herein, examples of an alkyl group having 1 to 8 carbon atoms include methyl group, ethyl group, n-propyl group, iso-propyl group, n-butyl group, iso-butyl group, sec-butyl group, tert-butyl group, tert-pentyl group, iso-octyl group, tert-octyl group and 2-ethylhexyl group, examples of a cycloalkyl group having 5 to 8 carbon atoms include cyclopentyl group, cyclohexyl group, cycloheptyl group and cyclooctyl group, examples of an alkylcycloalkyl group having 6 to 12 carbon atoms include 1-methylcyclopentyl group, 1-methylcyclohexyl group and 1-methyl-4-iso-propylcyclohexyl group, and examples of an aralkyl group having 7 to 12 carbon atoms include benzyl group, α-methylbenzyl group and α,α-dimethylbenzyl group.

In the formula (I), $R^1$, $R^2$ and $R^4$ are preferably an alkyl group having 1 to 8 carbon atoms, a cycloalkyl group having 5 to 8 carbon atoms and an alkylcycloalkyl group having 6 to 12 carbon atoms. In particular, $R^1$ and $R^4$ are preferably tert-alkyl groups such as tert-butyl group, tert-pentyl group and tert-octyl group, cyclohexyl group, and 1-methylcyclohexyl group.

In the formula (I), in particular, $R^2$ is preferably an alkyl groups having 1 to 5 carbon atoms such as methyl group, ethyl group, n-propyl group, iso-propyl group, n-butyl group, iso-butyl group, sec-butyl group, tert-butyl group and tert-pentyl group, more preferably methyl group, tert-butyl group and tert-pentyl group.

In the formula (I), in particular, $R^5$ is preferably a hydrogen atom, an alkyl group having 1 to 8 carbon atoms and a cycloalkyl group having 5 to 8 carbon atoms, more preferably a hydrogen atom, and alkyl groups having 1 to 5 carbon atoms such as methyl group, ethyl group, n-propyl group, iso-propyl group, n-butyl group, iso-butyl group, sec-butyl group, tert-butyl group and tert-pentyl group.

In the formula (I), $R^3$ denotes a hydrogen atom or an alkyl group having 1 to 8 carbon atoms; examples of an alkyl group having 1 to 8 carbon atoms include the same alkyl group as described above. In particular, a hydrogen atom or an alkyl group having 1 to 5 carbon atoms are preferable, and a hydrogen atom or methyl group are more preferable.

In the formula (I), X denotes a single bond, a sulfur atom or a methylene group. The methylene group may have a substituent of an alkyl group having 1 to 8 carbon atoms or a cycloalkyl group having 5 to 8 carbon atoms. Here, examples of an alkyl group having 1 to 8 carbon atoms and a cycloalkyl group having 5 to 8 carbon atoms, which may substitute in the methylene group, include the same alkyl group and cycloalkyl group as described above, respectively. In particular, X is preferably a single bond, methylene group, or methylene group substituted with methyl group, ethyl group, n-propyl group, iso-propyl group, n-butyl group, iso-butyl group or tert-butyl group, more preferably a single bond.

In the formula (I), A denotes an alkylene group having 1 to 8 carbon atoms or a *—$COR^7$ group. $R^7$ denotes a single bond or an alkylene group having 1 to 8 carbon atoms, and * denotes a bonding hand on the side of oxygen.

Herein, examples of an alkylene group having 1 to 8 carbon atoms include methylene group, ethylene group, propylene group, butylene group, pentamethylene group, hexamethylene group, octamethylene group and 2,2-dimethyl-1,3-propylene group, preferably propylene group. In a *—$COR^7$ group * denotes that a carbonyl group bonds to an oxygen atom of a phosphite group. Examples of an alkylene group having 1 to 8 carbon atoms in $R^7$ include methylene group, ethylene group, propylene group, butylene group, pentamethylene group, hexamethylene group, octamethylene group and 2,2-dimethyl-1,3-propylene group. $R^7$ is preferably a single bond and ethylene group.

In the formula (I), one of Y and Z denotes a hydroxy group, and the other one of Y and Z denotes a hydrogen atom or an alkyl group having 1 to 8 carbon atoms. Herein, examples of an alkyl group having 1 to 8 carbon atoms include the same alkyl groups as described above.

Examples of phosphites (I) include 2,4,8,10-tetra-tert-butyl-6-[3-(3-methyl-4-hydroxy-5-tert-butylphenyl)propoxy]dibenzo[d,f][1,3,2]dioxaphosphepin, 6-[3-(3,5-di-tert-butyl-4-hydroxyphenyl)propoxy]-2,4,8,10-tetra-tert-butyldibenzo[d,f][1,3,2]dioxaphosphepin, 6-[3-(3,5-di-tert-butyl-4-hydroxyphenyl)propoxy]-4,8-di-tert-butyl-2,10-dimethyl-12H-dibenzo[d,g][1,3,2]dioxaphosphocin, and 6-[3-(3,5-di-tert-butyl-4-hydroxyphenyl)propionyloxy]-4,8-di-tert-butyl-2,10-dimethyl-12H-dibenzo[d,g][1,3,2]dioxaphosphocin. In particular, 2,4,8,10-tetra-tert-butyl-6-[3-(3-methyl-4-hydroxy-5-tert-butylphenyl)propoxy]dibenzo[d,f][1,3,2]dioxaphosphepin is preferable.

The blended amount of phosphites (I) in a thermoplastic polymer composition of the present invention is within a range of ordinarily 0.005 to 5 parts by weight, preferably 0.01 to 5 parts by weight, more preferably 0.01 to 1 part by weight, and particularly preferably 0.03 to 1 part by weight with respect to 100 parts by weight of a thermoplastic polymer.

(Erythritols)

Erythritols used for the present invention are at least one kind selected from the group consisting of pentaerythritol, dipentaerythritol, tripentaerythritol and polypentaerythritol; above all, dipentaerythritol is more preferable.

The blended amount of erythritols in a thermoplastic polymer composition of the present invention is within a range of ordinarily 0.001 to 1 part by weight, preferably 0.005 to 0.5 part by weight and particularly preferably 0.01 to 0.5 part by weight with respect to 100 parts by weight of a thermoplastic polymer.

(Organophosphorus Antioxidant Different from Phosphites (I))

It is preferable that a thermoplastic polymer composition of the present invention further contains an organophosphorus antioxidant different from phosphites (I) in addition to a thermoplastic polymer, phosphites (I) and erythritols.

Examples of an organophosphorus antioxidant different from phosphites (I) include tris(2,4-di-tert-butylphenyl)phosphite, bis(2,4-di-tert-butylphenyl)pentaerythritol diphosphite, bis(2,6-di-tert-butyl-4-methylphenyl)pentaerythritol diphosphite, bis(2,4-di-cumylphenyl)pentaerythritol diphosphite, and tetrakis(2,4-di-tert-butylphenyl)-4,4'-biphenylene diphosphonite. In particular, tris(2,4-di-tert-butylphenyl)phosphite is preferable.

It is preferable that a thermoplastic polymer composition of the present invention contains an organophosphorus antioxidant different from phosphites (I) within a range of 0.005 to 5 parts by weight, preferably 0.01 to 1 part by weight and particularly preferably 0.03 to 0.5 part by weight with respect to 100 parts by weight of a thermoplastic polymer.

(Other Additives)

Additives except phosphites (I), an organophosphorus antioxidant different from phosphites (I) and erythritols may be further blended with a thermoplastic polymer composition of the present invention. Examples of such additives include a phenolic antioxidant, a sulfuric antioxidant, a hindered amine light stabilizer, an antistatic agent, an ultraviolet absorbing agent, a nucleating agent, a lubricant, a neutralizer, a stabilizer, an auxiliary stabilizer, a metal deactivator, a fire retardant, a foaming agent, a filler and a pigment.

(Resistance to Heat Discoloration)

A thermoplastic polymer composition of the present invention is excellent in resistance to heat discoloration, that is, the obtained molded article is less changed in color even though repeatedly molded at high temperature.

Herein, resistance to heat discoloration is a property such that the obtained molded article is less colored even though repeatedly molded at a temperature of 270° C. five times. Specific evaluations of resistance to heat discoloration are performed in the following manner. First, a thermoplastic polymer composition is kneaded under an atmosphere of air at a temperature of 230° C. and the number of screw revolutions of 80 rpm by using a twin-screw extruder with a diameter of 30 mm to obtain pellets (1), which is kneaded under an atmosphere of air at a temperature of 270° C. and the number of screw revolutions of 50 rpm by using a single-screw extruder with a diameter of 30 mm to obtain pellets. This extrusion molding by the single-screw extruder is repeatedly performed five times to obtain pellets (2). The obtained pellets (1) and (2) are each injection-molded into a 1-mm-thick sheet at a temperature of 230° C. to measure a yellowness index (YI) value by using a calorimeter in conformity to JIS K7105. Resistance to heat discoloration is evaluated by a difference between a YI value of the sheet obtained from the pellets (2) and a YI value of the sheet obtained from the pellets (1). The smaller the difference between a YI value of the sheet obtained from the pellets (2) and a YI value of the sheet obtained from the pellets (1) is, the more highly resistance to heat discoloration is evaluated.

(Process Stability)

A thermoplastic polymer composition of the present invention tends to be excellent in process stability.

Process stability is a property such that moldability is less changed even though repeatedly molded at a temperature of 270° C. five times. With regard to the pellets (1) and (2)

obtained in the same manner as the above-mentioned evaluations of resistance to heat discoloration, Melt Index (MI) value is measured by using a melt indexer in conformity to JIS K7210 to evaluate process stability by a difference between a MI value of the pellets (2) and a MI value of the pellets (1). The smaller the difference between a MI value of the pellets (2) and a MI value of the pellets (1) is, the more highly process stability is evaluated.

(Resistance to Discoloration by NOx)

A thermoplastic polymer composition of the present invention tends to be excellent in resistance to discoloration by NOx.

Resistance to discoloration by NOx is a property such that coloration is low even though exposed to $NO_x$ gas of 650 ppm for two weeks. With regard to the evaluations of resistance to discoloration by NOx, first, a thermoplastic polymer composition is kneaded under an atmosphere of air at a temperature of 230° C. and the number of screw revolutions of 80 rpm by using a twin-screw extruder with a diameter of 30 mm to obtain pellets (1), which is injection-molded into a 1-mm-thick sheet at a temperature of 230° C. to measure YI value by using a calorimeter in conformity to JIS K7105, and is thereafter exposed to $NO_x$ of 650 ppm for two weeks in conformity to JIS L0855. Also, with regard to the sheet two weeks after being exposed to $NO_x$, YI value is similarly measured by using a calorimeter to evaluate resistance to discoloration by NOx by a difference from a YI value of the sheet before being exposed to $NO_x$. The smaller the difference between a YI value of the sheet two weeks after being exposed to $NO_x$ and a YI value of the sheet before being exposed to $NO_x$ is, the more highly resistance to discoloration by NOx is evaluated.

EXAMPLES

The present invention is hereinafter described in further detail by examples. Part and % signify the basis of weight unless otherwise specified.

Specifically, the following compounds were each used in Examples and Comparative Examples.

Thermoplastic polymer: propylene-ethylene block copolymer (MI: 9 to 10 g/10 minutes, manufactured by Sumitomo Chemical Co., Ltd.)

Phosphites (I): 2,4,8,10-tetra-tert-butyl-6-[3-(3-methyl-4-hydroxy-5-tert-butylphenyl)propoxy]dibenzo[d,f][1,3,2]dioxaphosphepin (SUMILIZER GP, manufactured by Sumitomo Chemical Co., Ltd.)

Erythritols: dipentaerythritol (dipentaerythritol, manufactured by ACROS)

Organophosphorus antioxidant different from phosphites (I): Tris(2,4-di-tert-butylphenyl)phosphite (IRGAFOS168, manufactured by Ciba Specialty Chemicals K.K.)

Example 1

100 parts of a thermoplastic polymer, 0.1 part of phosphites (I) and 0.03 part of erythritols were blended and kneaded under an atmosphere of air at a temperature of 230° C. and the number of screw revolutions of 80 rpm by using a twin-screw extruder with a diameter of 30 mm (NAS30-type extruder, manufactured by Nakatani) to obtain pellets (1) as a thermoplastic polymer composition of the present invention. These pellets (1) were kneaded under an atmosphere of air at a temperature of 270° C. and the number of screw revolutions of 50 rpm by using a single-screw extruder with a diameter of 30 mm (VS30-28-type extruder, manufactured by Tanabe Plastics) to obtain pellets. This extrusion molding by the single-screw extruder was repeatedly performed five times to obtain pellets (2).

Each of the pellets (1) and (2) was injection-molded into a 1-mm-thick sheet at a temperature of 230° C. by using an injection molder (ROBOSHOTα-30A, manufactured by Fanuc Ltd.) to measure a yellowness index (YI) value by using a calorimeter (CM-3500d, manufactured by Konica Minolta, Inc.) in conformity to JIS K7105. The difference between a YI value of the sheet obtained from the pellets (2) and a YI value of the sheet obtained from the pellets (1) was 1.36.

Examples 2 to 13 and Comparative Examples 1 to 3

A thermoplastic polymer composition was prepared in the same manner as Example 1 except for using phosphites (I) and erythritols by parts described in Table 1 to evaluate resistance to heat discoloration. The results were shown in Table 1 together with Example 1.

With regard to the evaluations of resistance to heat discoloration, in the far-right column of Table 1, the case where the difference between a YI value of the sheet obtained from the pellets (2) and a YI value of the sheet obtained from the pellets (1) was less than 2 was denoted as ○, the case where the difference was 2 or more and less than 4 was denoted as △, and the case where the difference was 4 or more was denoted as ×, for the reason that the smaller difference in the YI value signifies more highly resistance to heat discoloration.

TABLE 1

|  | Phosphites (I) (parts by weight) | Erythritols (parts by weight) | Organophosphorus antioxidant different from phosphites (I) (parts by weight) | Resistance to heat discoloration | |
|---|---|---|---|---|---|
|  |  |  |  | Difference in YI value | Evaluations |
| Example 1 | 0.1 | 0.03 | — | 1.36 | ○ |
| Example 2 | 0.1 | 0.01 | — | 1.40 | ○ |
| Example 3 | 0.1 | 0.05 | — | 1.26 | ○ |
| Example 4 | 0.1 | 0.1 | — | 1.54 | ○ |
| Example 5 | 0.1 | 0.2 | — | 0.69 | ○ |
| Example 6 | 0.01 | 0.03 | — | 1.98 | ○ |
| Example 7 | 0.05 | 0.03 | — | 1.25 | ○ |
| Example 8 | 0.5 | 0.03 | — | 1.10 | ○ |
| Example 9 | 1 | 0.03 | — | 0.96 | ○ |

TABLE 1-continued

|  | Phosphites (I) (parts by weight) | Erythritols (parts by weight) | Organophosphorus antioxidant different from phosphites (I) (parts by weight) | Resistance to heat discoloration | |
|---|---|---|---|---|---|
|  |  |  |  | Difference in YI value | Evaluations |
| Example 10 | 5 | 0.03 | — | 0.80 | ○ |
| Example 11 | 0.033 | 0.03 | 0.067 | 1.15 | ○ |
| Example 12 | 0.05 | 0.03 | 0.05 | 1.34 | ○ |
| Example 13 | 0.067 | 0.03 | 0.033 | 1.04 | ○ |
| Comparative Example 1 | — | — | — | 4.00 | X |
| Comparative Example 2 | — | 0.03 | — | 2.33 | Δ |
| Comparative Example 3 | 0.1 | — | — | 2.52 | Δ |

Process Stability

Example 14

With regard to the pellets (1) and (2) obtained in Example 1, Melt Index (MI) value was measured by using a melt indexer (L217-E14011, manufactured by TechnoSeven Co., Ltd.) in conformity to JIS K7210. The difference between a MI value of the pellets (2) and a MI value of the pellets (1) was 4.49. The smaller difference in the MI value signifies more highly process stability.

Comparative Examples 4 to 6

Process stability was measured in the same manner as Example 14 except for using the pellets (1) and (2) of Comparative Example 1 in Comparative Example 4, the pellets (1) and (2) of Comparative Example 2 in Comparative Example 5, and the pellets (1) and (2) of Comparative Example 3 in Comparative Example 6.

The results were shown in Table 2 together with Example 14.

In Table 2, the case where the difference between a MI value of the pellets (2) and a MI value of the pellets (1) was less than 5 was denoted as ○, the case where the difference was 5 or more and less than 10 was denoted as Δ, and the case where the difference was 10 or more was denoted as x.

Resistance to Discoloration by NOx

Example 15

The pellets (1) obtained in Example 1 were injection-molded into a 1-mm-thick sheet at a temperature of 230° C. by using an injection molder (ROBOSHOTα-30A, manufactured by Fanuc Ltd.) to measure a yellowness index (YI) value by using a calorimeter (CM-3500d, manufactured by Konica Minolta, Inc.) in conformity to JIS K7105.

Subsequently, the sheet was exposed to $NO_x$ of 650 ppm for two weeks in conformity to JIS L0855. With regard to the sheet two weeks after being exposed to $NO_x$, a YI value was similarly measured by using the calorimeter. The difference in the YI value of the sheet before and after being exposed to $NO_x$ was 0.94. The smaller difference in YI value signifies more excellent resistance to discoloration by NOx.

Examples 16 to 25 and Comparative Examples 7 to 9

The pellets (1) were prepared in the same manner as Example 1 except for using phosphites (I) and erythritols by parts described in Table 3. Next, with regard to each of the pellets (1), resistance to discoloration by NOx was evaluated in the same manner as Example 15. The results were shown in Table 3 together with Example 15.

TABLE 2

|  | Phosphites (I) (parts by weight) | Erythritols (parts by weight) | Organophosphorus antioxidant different from phosphites (I) (parts by weight) | Process stability | |
|---|---|---|---|---|---|
|  |  |  |  | Difference in MI value | Evaluations |
| Example 14 | 0.1 | 0.03 | — | 4.49 | ○ |
| Comparative Example 4 | — | — | — | 27.64 | X |
| Comparative Example 5 | — | 0.03 | — | 38.87 | X |
| Comparative Example 6 | 0.1 | — | — | 5.58 | Δ |

In Table 3, the case where the difference between a YI value of the sheet after being exposed to $NO_x$ and a YI value of the sheet before being exposed to $NO_x$ was less than 1.5 was denoted as ○, the case where the difference was 1.5 or more and less than 2 was denoted as Δ, and the case where the difference was 2 or more was denoted as x.

TABLE 3

| | Phosphites (I) (parts by weight) | Erythritols (parts by weight) | Organophosphorus antioxidant different from phosphites (I) (parts by weight) | Resistance to discoloration by NOx | |
|---|---|---|---|---|---|
| | | | | Difference in YI value | Evaluations |
| Example 15 | 0.1 | 0.03 | — | 0.94 | ○ |
| Example 16 | 0.1 | 0.01 | — | 0.87 | ○ |
| Example 17 | 0.1 | 0.05 | — | 0.86 | ○ |
| Example 18 | 0.1 | 0.1 | — | 0.83 | ○ |
| Example 19 | 0.1 | 0.2 | — | 0.74 | ○ |
| Example 20 | 0.05 | 0.03 | — | 1.17 | ○ |
| Example 21 | 0.5 | 0.03 | — | 1.16 | ○ |
| Example 22 | 1 | 0.03 | — | 1.35 | ○ |
| Example 23 | 0.033 | 0.03 | 0.067 | 0.91 | ○ |
| Example 24 | 0.05 | 0.03 | 0.05 | 0.89 | ○ |
| Example 25 | 0.067 | 0.03 | 0.033 | 1.00 | ○ |
| Comparative Example 7 | — | — | — | 2.57 | X |
| Comparative Example 8 | — | 0.03 | — | 1.88 | Δ |
| Comparative Example 9 | 0.1 | — | — | 1.63 | Δ |

INDUSTRIAL APPLICABILITY

A thermoplastic polymer composition of the present invention is excellent in resistance to heat discoloration.

What is claimed is:

1. A thermoplastic polymer composition comprising a thermoplastic polymer, phosphites represented by the formula (I), and at least one kind of erythritols selected from the group consisting of pentaerythritol, dipentaerythritol and tripentaerythritol:

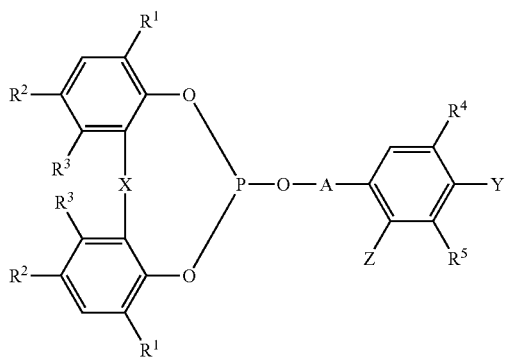

(I)

wherein $R^1$, $R^2$, $R^4$ and $R^5$ each independently denotes a hydrogen atom, an alkyl group having 1 to 8 carbon atoms, a cycloalkyl group having 5 to 8 carbon atoms, an alkylcycloalkyl group having 6 to 12 carbon atoms, an aralkyl group having 7 to 12 carbon atoms or a phenyl group, and $R^3$ denotes a hydrogen atom or an alkyl group having 1 to 8 carbon atoms; X denotes a single bond, a sulfur atom or a —$CHR^6$ group ($R^6$ denotes a hydrogen atom, an alkyl group having 1 to 8 carbon atoms or a cycloalkyl group having 5 to 8 carbon atoms); A denotes an alkylene group having 1 to 8 carbon atoms or a *—$COR^7$ group ($R^7$ denotes a single bond or an alkylene group having 1 to 8 carbon atoms, and * denotes a bonding hand on the side of oxygen); and one of Y and Z denotes a hydroxyl group, an alkoxy group having 1 to 8 carbon atoms or an aralkyloxy group having 7 to 12 carbon atoms, and the other one of Y and Z denotes a hydrogen atom or an alkyl group having 1 to 8 carbon atoms).

2. The thermoplastic polymer composition according to claim 1, comprising 0.005 to 5 parts by weight of phosphites represented by the formula (I), and 0.01 to 0.5 part by weight of at least one kind of erythritols selected from the group consisting of pentaerythritol, dipentaerythritol and tripentaerythritol with respect to 100 parts by weight of the thermoplastic polymer.

3. The thermoplastic polymer composition according to claim 1 or 2, further comprising 0.005 to 5 parts by weight of at least one kind of organophosphorus antioxidants selected from the group consisting of tris(2,4-di-t-butylphenyl)phosphite, bis(2,4-di-t-butylphenyl)pentaerythritol diphosphite, bis(2,6-di-t-butyl-4-methylphenyl)pentaerythritol diphosphite, bis(2,4-di-cumylphenyl)pentaerythritol diphosphite, and tetrakis(2,4-di-tert-butylphenyl)-4,4'-biphenylene diphosphonite with respect to 100 parts by weight of the thermoplastic polymer.

4. The thermoplastic polymer composition according to claim 1 or 2, wherein the thermoplastic polymer is polyolefin.

5. The thermoplastic polymer composition according to claim 1 or 2, wherein the thermoplastic polymer is an ethylene resin and/or a propylene resin.

* * * * *